United States Patent [19]
Ninagawa et al.

[11] 3,887,753
[45] June 3, 1975

[54] FLUORESCENT FILM FOR COLOR PICTURE TUBE AND PROCESS OF PREPARING SAME

[75] Inventors: Chikayoshi Ninagawa, Takatsuki; Osamu Yoshida, Kyoto; Shigeya Ashizaki, Hirakata, all of Japan

[73] Assignee: Matsushita Electronics Corporation, Kadoma-shi, Osaka, Japan

[22] Filed: June 27, 1973

[21] Appl. No.: 374,099

Related U.S. Application Data

[63] Continuation-in-part of Ser. No. 62,150, Aug. 7, 1970, abandoned, which is a continuation of Ser. No. 650,827, July 3, 1967, abandoned.

[30] Foreign Application Priority Data
July 22, 1966    Japan................................. 41-48443

[52] U.S. Cl. .................. 428/328; 427/64; 427/221; 252/301.3; 252/301.4
[51] Int. Cl. .......................... B44d 5/00; G03c 5/02
[58] Field of Search.. 117/33.5 C, 33.5 CM, 33.5 R, 117/100 R, 100 B; 252/301.3, 301.4

[56] References Cited
UNITED STATES PATENTS
| | | | |
|---|---|---|---|
| 2,873,137 | 3/1959 | Butler et al. | 117/33.5 R |
| 2,951,169 | 8/1960 | Faria et al. | 117/100 |
| 3,097,103 | 7/1963 | Homer et al. | 252/301.3 |
| 3,147,226 | 9/1964 | Tonck | 252/301.4 |

*Primary Examiner*—William R. Trenor
*Attorney, Agent, or Firm*—Stevens, Davis, Miller & Mosher

[57] ABSTRACT

Phosphor particles coated with a mixture of $GeO_2$ and $SiO_2$ or a mixture of $WO_3$ and $SiO_2$ are dispersed in an aqueous solution of a photosensitive resin together with a protective dispersing agent for the particles in the solution to form a slurry. $Y_2O_3$:Eu phosphor particles with the coating are chemically stable and do not hydrolize in the slurry. The slurry is then applied to the inner surface of a glass tube. The resulting phosphor film is dried, printed and developed by the photographic technique to form a desired pattern of the phosphor material. By the invention manufacturing a bright color picture tube employing $Y_2O_3$:Eu phosphor becomes possible in commercial success.

6 Claims, 2 Drawing Figures

FLUORESCENT FILM FOR COLOR PICTURE TUBE AND PROCESS OF PREPARING SAME

This is a continuation-in-part application of application Ser. No. 62,150, filed Aug. 7, 1970 now abandoned which is a continuation application of application Ser. No. 650,827, filed July 3, 1967 now abandoned.

As is widely known, sulfide phosphors have been used in the production of fluorescent film material for conventional color picture tubes. In the conventional procedure, a phosphor such as ZnS:Ag or (ZnCd)S:Ag is slurried with water and polyvinyl alcohol, and a photosensitivity activator consisting of ammonium bichromate is added to the slurry to prepare the fluorescent material. It has also recently been proposed to use a rare earth phosphor such as a yttrium oxide phosphor activated with europium ($Y_2O_3$:Eu), which is higher in radiation intensity than the sulfide phosphors. The fluorescent materials described above are applied as a film to the inner wall surface of the front glass plate of the picture tube. The film is then subjected to drying, printing, and developing by employing a photographic technique to form the desired phosphor dots or strips.

The above described sulfide phosphors and rare earth phosphors have a disadvantage in that they are undesirably chemically reactive with the ammonium bichromate which is added as the photosensitivity activator. That is, a sulfide phosphor may adsorb and decompose the bichromic ion of the ammonium bichromate, and change it into chromic ion, while the yttrium oxide phosphor is similarly apt to be subjected to hydrolysis. Also, these two types of phosphors considerably lower the photosensitivity of polyvinyl alcohol activated by ammonium bichromate. Therefore, with these phosphors employed, it is impossible to successfully carry out the printing procedure, or otherwise this procedure takes a long time. Moreover, the chromic ion formed by decomposition on the phosphor surface cannot be removed by a washing operation after the phosphor has been printed, and due to a heat treatment after the application of the fluorescent film, the chromic ion may penetrate into the interior of the phosphor, for example, through the grid defects therein. This causes deterioration of the phosphor due to contamination and decomposition and drastically lowers the brightness of the fluorescent film.

It has also been found that on account of the poor hydrophilic property of both sulfide and rare earth phosphors, a number of local hydrophobic regions are produced in the film during its application to the inner wall of the front glass plate of the picture tube and the subsequent drying. This results in the formation of a blemish-like pattern on the fluorescent film.

It has been proposed to treat the surface of phosphor particles with calcium or barium compounds in order to prevent hydrolysis, however, this treatment is not a fully satisfactory solution to the problem. The prior art has also proposed the use of water glass, however, the use of water glass has the drawback that gelation is caused, and deteriorates the characteristics of the phosphor suspension.

It is the principal object of the present invention to prepare a fluorescent film of good chemical and optical stability which also exhibits high radiation brightness.

Figure 1:
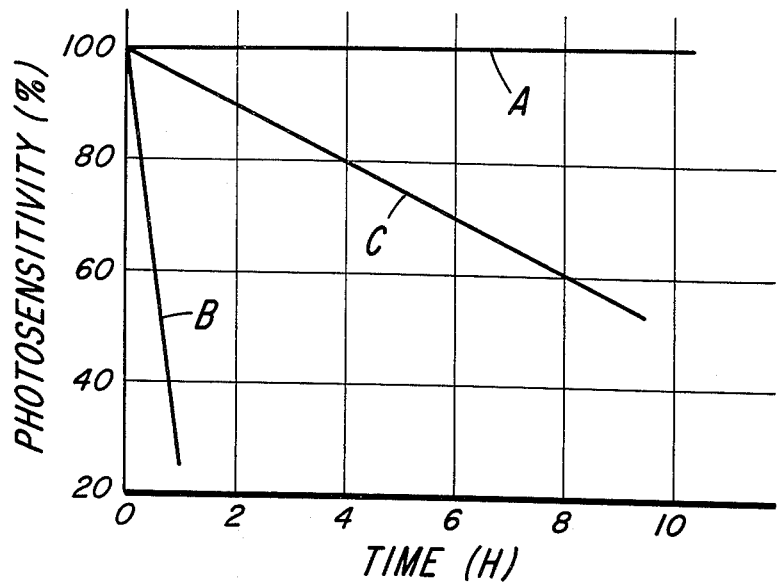
FIG. 1 is a graph of photosensitivity versus time and shows the differences in photosensitivity depending upon the method of treatment of the phosphors.

In order to achieve a satisfactory solution to the prior art drawbacks, the fluorescent film according to the present invention is prepared by coating phosphor particles of the types described above with 0.5 – 5.0% by weight of a mixture of $GeO_2$ and $SiO_2$ or a mixture of $WO_3$ and $SiO_2$, dispersing the coated phosphor particles in an aqueous polyvinyl alcohol suspension together with a protective dispersing agent for the phosphor particles in the solution, stirring the resulting mixture, adding to the mixture a photosensitivity activator such as ammonium bichromate, and applying the thus obtained slurry to the inner wall of the picture tube. Either the $GeO_2$ content or the $WO_3$ content in the coated phosphor particles should be in the range from 0.3 to 4.9% by weight. The dispersing agent should be colloidal silica, Sorgen TW–20 or the like that does not cause gelation of the resulting slurry. The dispersing agent may be a nonionic surfactant. The final fluorescent film is obtained by conventional drying and printing procedures.

The polyvinyl alcohol content and the colloidal silica content in the aqueous suspension may be about 4–7% by weight and about 0.01–0.5% by weight, respectively.

The above-mentioned coating of the present invention is performed, for example, by the steps of preparing a mixture of water glass and another mixture of $GeO_2$ and $SiO_2$ or $WO_3$ and $SiO_2$, introducing baked phosphor particles into said mixture, stirring the resulting mixture and heat-treating the resulting mixture thereby to apply a coating of the oxide mixture to the whole surface of each phosphor particle.

Both of the mixture of $GeO_2$ and $SiO_2$ and the mixture of $WO_3$ and $SiO_2$ utilized in carrying out the present invention are chemically stable and hydrophilic. The used dispersing agent exerts no ill effect on the phosphor suspension.

In the fluorescent slurry according to one aspect of the invention, particles of colloidal silica may be adsorbed on the surface of the coated phosphor particles as a protective dispersing agent, and are thereby positively charged. Therefore, the phosphor is firmly protected by the formation of electric double layers on its surface, and the dispersability of the phosphor particles is considerably improved. In this manner, it is possible to considerably shorten the required time for dispersing the phosphor particles such as by ball milling processing, and at the same time minimize the conventional drawback of a reduction in the radiation efficiency of the phosphor particles due to mechanical shock during the ball milling. The specific viscosity of the phosphor is reduced by the treatment of the present invention.

The colloidal silica consists of $SiO_2$ fine particles of 50 – 600 m$\mu$ having a chemically stable covering of sodium aluminate, and the surface thereof becomes positively charged in the solution. The phosphor particles are perfectly protected from the photosensitivity activator, are not subject to chemical deterioration and, with the reduction of viscosity, become of appropriate hydrophilic property. Further, the protection and dispersion are increased by using colloidal silica, to obtain the effects of improvement of radiation efficiency and reduction of formation of local hydrophobic portions of the film. Furthermore, the mechanical shock on the phosphor during preparation can be reduced. Thus, it is possible to prepare a color picture tube of chemical and optical stability and high radiation brightness.

In the event that the amount of a mixture of $GeO_2$ and $SiO_2$ or a mixture of $WO_3$ and $SiO_2$ is out of the above mentioned range, the protection effect on the phosphor particles is unsatisfactory and the radiation brightness is lowered.

Next an embodiment of the present invention will be described.

100g of europium-activated yttrium oxide ($Y_2O_3$:Eu) having a mean particle diameter of about $6.5\mu$, 3.0g of germanium oxide ($GeO_2$) in fine particles and 1.0g of silicon oxide ($SiO_2$) also in fine particles were mixed with an aqueous suspension containing 0.1% by weight of potassium water glass ($K_2SiO_4$). The mixture was stirred for two hours in a ball mill. Then, the mixture, after being allowed to stand for drying, was put in a quartz crucible and heated for about one hour at 850°C in an electric furnace. Thereby, the phosphor particles were coated with a mixture of 1.5% by weight of $GeO_2$ and 0.5% by weight of $SiO_2$.

Next, 300g of the thus coated phosphor particles was mixed with 1 liter of an aqueous suspension containing 5% by weight of polyvinyl alcohol powder and 0.1% by weight of ammonium bichromate as well as 0.1% by weight of colloidal silica, and the resulting mixture was stirred to form a phosphor slurry. This slurry could be applied to the inner face of the glass faceplate of a color picture tube by any known conventional technique.

FIG. 1 is a graph showing the photosensitivity of fluorescent film materials, with the photosensitivity plotted on the vertical axis, and time plotted on the horizontal axis. In this figure, it is evident that the fluorescent film material of the present invention represented by curve A is much more stable chemically than a conventional fluorescent film material represented by curve B. Curve C represents the characteristics of a fluorescent film material prepared by introducing phosphor particles which have been coated with a mixture of $GeO_2$ and $SiO_2$ into an ordinary suspension containing no colloidal silica, stirring and heat-treating the resulting mixture.

Figure 2:
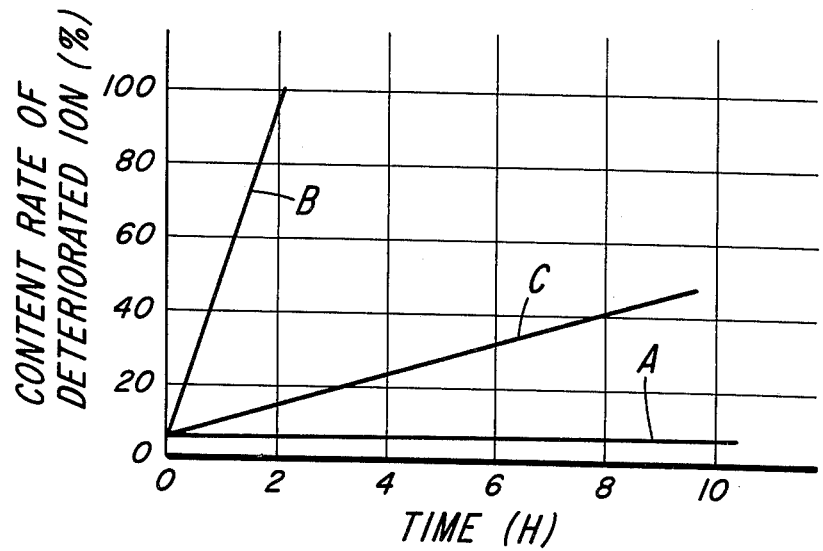
FIG. 2 is a graph of the rate of deteriorated ion content versus time for phosphors prepared by different procedures.

FIG. 2 is a graph in which the rate of deteriorated ion content is plotted on the vertical axis and the time after preparation of the fluorescent film material is plotted on the horizontal axis. In this figure, curve A represents a yttrium oxide phosphor treated in accordance with the present invention, curve B represents a conventional fluorescent film material, and curve C represents the characteristics of a fluorescent film material prepared by introducing phosphor particles having been coated with a mixture of $GeO_2$ and $SiO_2$ into an ordinary suspension containing no colloidal silica, stirring and heat-treating the resulting mixture. It is evident from this figure that the fluorescent film material of the present invention represented by curve A has a much smaller rate of deterioration than the conventional materials.

What is claimed is:

1. A cathode ray tube comprising
   a face plate having a fluorescent film on one surface comprising phosphor particles coated with a member selected from the group consisting of a mixture of $GeO_2$ and $SiO_2$ and a mixture of $WO_3$ and $SiO_2$ wherein the amount of said member constitutes from 0.5 to 5.0% of the weight of said phosphor particles and in the first instance the amount of the $GeO_2$ constitutes 0.3 to 4.9% of the weight of said particles while in the second instance the amount of $WO_3$ constitutes 0.3 to 4.9% of the weight of said particles.

2. The cathode ray tube of claim 1 wherein the phosphor materials consist of phosphors selected from the group consisting of sulfide phosphors and rare earth phosphors.

3. A process for preparing a fluorescent film on a color picture tube having a glass faceplate with an inner surface comprising
   coating phosphor particles with a member selected from the group consisting of a mixture of $GeO_2$ and $SiO_2$ and a mixture of $WO_3$ and $SiO_2$ wherein the amounts of said member constitutes from 0.5 to 5.0% of the weight of said phosphor particles and wherein the amount of the $GeO_2$ in the first member constitutes 0.3 to 4.9% of the weight of said particles while the weight of $WO_3$ in the second member constitutes 0.3 to 4.9% of the weight of said particles forming a slurry of the coated phosphor particle with a photosensitive resin by,
   introducing said coated particles together with a dispersing agent into said photosensitive resin, said dispensing agent being such as not to cause gelation of the slurry,
   applying the resulting slurry to the inner surface of the picture tube, and
   drying and heating the coated phosphor particles to form the fluorescent film.

4. A process according to claim 3, wherein said coating of the phosphor particles is prepared by steps comprising preparing a mixture selected from the group consisting of a mixture of $GeO_2$ and $SiO_2$ and a mixture of $WO_3$ and $SiO_2$, and water glass, introducing baked phosphor particles into said mixture, stirring the resulting mixture and baking the resulting mixture thereby to apply a coating of said mixture to the whole surface of said each phosphor particle.

5. A process according to claim 3 wherein said dispersing agent consists of colloidal silica constituting from about 0.01 to 0.5% of the weight of said photosensitive resin solution including said colloidal silica.

6. A process according to claim 3, wherein said photosensitive resin comprises an aqueous polyvinyl alcohol solution containing ammonium bichromate.

* * * * *